(12) United States Patent
Sibik

(10) Patent No.: US 6,276,152 B1
(45) Date of Patent: Aug. 21, 2001

(54) CHILLER CAPACITY CONTROL WITH VARIABLE CHILLED WATER FLOW COMPENSATION

(75) Inventor: Lee L. Sibik, Onalaska, WI (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/564,563

(22) Filed: May 4, 2000

Related U.S. Application Data

(62) Division of application No. 09/244,786, filed on Feb. 5, 1999, now Pat. No. 6,085,532.

(51) Int. Cl.[7] .................................................. F25D 17/02
(52) U.S. Cl. ................................ 62/201; 62/179; 62/203
(58) Field of Search ................................ 62/201, 228.4, 62/203, 204, 209, 205, 177, 179, 180, 185

(56) References Cited

U.S. PATENT DOCUMENTS

| | | | |
|---|---|---|---|
| 3,710,852 | 1/1973 | Porter | 165/62 |
| 4,269,034 | 5/1981 | Rzechula | 62/141 |
| 4,274,264 | 6/1981 | Andres . | |
| 4,483,152 | 11/1984 | Bitondo . | |
| 4,589,060 | 5/1986 | Zinsmeyer . | |
| 5,201,648 | 4/1993 | Lakowski | 418/201.2 |
| 5,347,821 | 9/1994 | Oltman et al. | 62/84 |
| 5,355,691 | 10/1994 | Sullivan et al. | 62/201 |
| 5,396,782 | 3/1995 | Ley et al. | 62/295 |
| 5,419,146 | 5/1995 | Sibik et al. | 62/115 |
| 5,553,997 | 9/1996 | Goshaw et al. . | |
| 5,561,599 | 10/1996 | Lu | 364/164 |
| 5,600,960 | * 2/1997 | Schwedler et al. | 62/201 X |
| 5,611,211 | * 3/1997 | Whipple, III | 62/209 X |
| 5,632,154 | 5/1997 | Sibik et al. | 62/99 |
| 5,669,225 | 9/1997 | Beaverson et al. . | |
| 5,946,926 | 9/1999 | Hartman . | |
| 5,950,443 | * 9/1999 | Meyer et al. | 62/228.4 X |

OTHER PUBLICATIONS

"Why Must Chillers Be Constant Flow Devices?", Jan.–Feb., 1980, vol. 9, No. 1, Trane Engineer's Newsletter.
"Don't Ignore Variable Flow", by James P. Waltz, Jul., 1997, Contracting Business.

* cited by examiner

*Primary Examiner*—Michael Powell Buiz
*Assistant Examiner*—Chen-Wen Jiang
(74) *Attorney, Agent, or Firm*—William J. Beres; William O'Driscoll

(57) ABSTRACT

A method of controlling chiller capacity in a chiller system. The method comprises the steps of: measuring entering the fluid temperature of a fluid entering a heat exchanger; measuring the fluid temperature of the fluid leaving the heat exchanger; determining a desired leaving fluid temperature; establishing chiller capacity as a function of the difference between leaving fluid temperature and the desired leaving fluid temperature; and adjusting the determined chiller capacity as a function of the difference between entering fluid temperature and the desired leaving fluid temperature.

19 Claims, 4 Drawing Sheets

CHILLER CAPACITY CONTROL WITH VARIABLE CHILLED WATER FLOW COMPENSATION

This is a Divisional of U.S. application Ser. No. 09/244, 786 filed on Dec. 5, 1999, now U.S. Pat. No. 6,085,532.

BACKGROUND OF THE INVENTION

The present invention is directed to chillers providing a chilled fluid such as water for use in air conditioning, refrigeration and the like. More particularly, the present invention is directed to the control of a variable flow chilled water system and represents an improvement in chiller capacity control.

A chiller is a device providing a chilled fluid. For many years it was considered necessary that chillers be constant flow devices. Articles such as "Why Must Chillers be Constant Flow Devices?", the Trane Engineering Newsletter, Volume 9, Number 1, January–February 1980 cite reliable heat transfer from a temperature control and instability in the control system as reasons supporting the premise that chillers must be constant flow devices.

In recent years this has changed and variable flow chilled water systems have begun to be implemented. An article "Don't Ignore Variable Flow" by James P. Waltz was published in the July 1997 issue of Contracting Business (pages 133–144) discussing basic variable flow chilled water systems. On the final page of the article, the author recognizes the ongoing problems in controlling variable flow chilled water systems. Problems are cited regarding minimum flow control, incorrect speed control, and insufficient cooling or flow capacity.

Many of these problems result from a chiller system which cannot compensate for simultaneous changes in the capacity of one or more chillers and in the flow rate of the chilled water being provided to the air handlers.

SUMMARY OF THE INVENTION

It is an object, feature and advantage of the present invention to solve the problems of the prior art systems.

It is an object, feature and advantage of the present invention to provide a variable flow chilled water system with controls that compensate for changes in chiller capacity and chilled water flow rate simultaneously.

It is an object, feature and advantage of the present invention to provide a controlled method for a chiller capacity control which automatically adjusts chiller capacity control to reject disturbances caused by variable flows in chilled water while maintaining control stability at low water flow rates.

It is a further object, feature and advantage of the present invention to accomplish this while adjusting chiller capacity to compensate for changes in the load.

It is an object, feature and advantage of the present invention to predict load changes and adjust the chiller capacity before the leaving water temperature of the chiller is affected by load changes and to adjust the chiller capacity before the leaving water temperature of the chiller is affected.

It is an object, feature and advantage of the present invention to improve chiller efficiency as water flow rates are reduced.

The present invention provides a method of controlling chiller capacity in a chiller system. The method comprises the steps of: measuring entering the fluid temperature of a fluid entering a heat exchanger; measuring the fluid temperature of the fluid leaving the heat exchanger; determining a desired leaving fluid temperature; establishing chiller capacity as a function of the difference between leaving fluid temperature and the desired leaving fluid temperature; and adjusting the determined chiller capacity as a function of the difference between entering fluid temperature and the desired leaving fluid temperature.

The present invention also provides a chiller system including a chilled fluid loop where the temperature of the fluid is controlled by varying the capacity of a chiller. The system comprises a variable capacity chiller including an evaporator; a chilled fluid loop in heat transfer relation with the evaporator; a sensor measuring the leaving fluid temperature of the evaporator; and a sensor measuring the entering fluid temperature of the evaporator. The chiller system also comprises a mechanism for providing a desired leaving fluid temperature; a pump controlling the rate of fluid flow in the fluid loop; and a controller operably controlling the chiller capacity in response to changes in the variable flow rate of the pump. The controller is connected to the setpoint mechanism and the entering and leaving fluid temperature sensors. The controller includes a feedback loop controlling chiller capacity in response to leaving fluid temperature and a feed forward loop controlling chiller capacity in response to entering fluid temperature.

The present invention further provides a method of controlling chiller capacity and chilled water flow rate in the chiller system. The method comprises the steps of: determining a leaving water temperature of chiller water leaving an evaporator; determining an entering water temperature of chilled water entering the evaporator; controlling the speed of a variable flow pump as a function of the leaving water temperature; controlling the capacity of a chiller system, operably connected to the evaporator and providing a heat sink, as a function of the entering water temperature and as a function of the leaving water temperature.

DETAILED DESCRIPTION OF THE DRAWING

Figure 1:
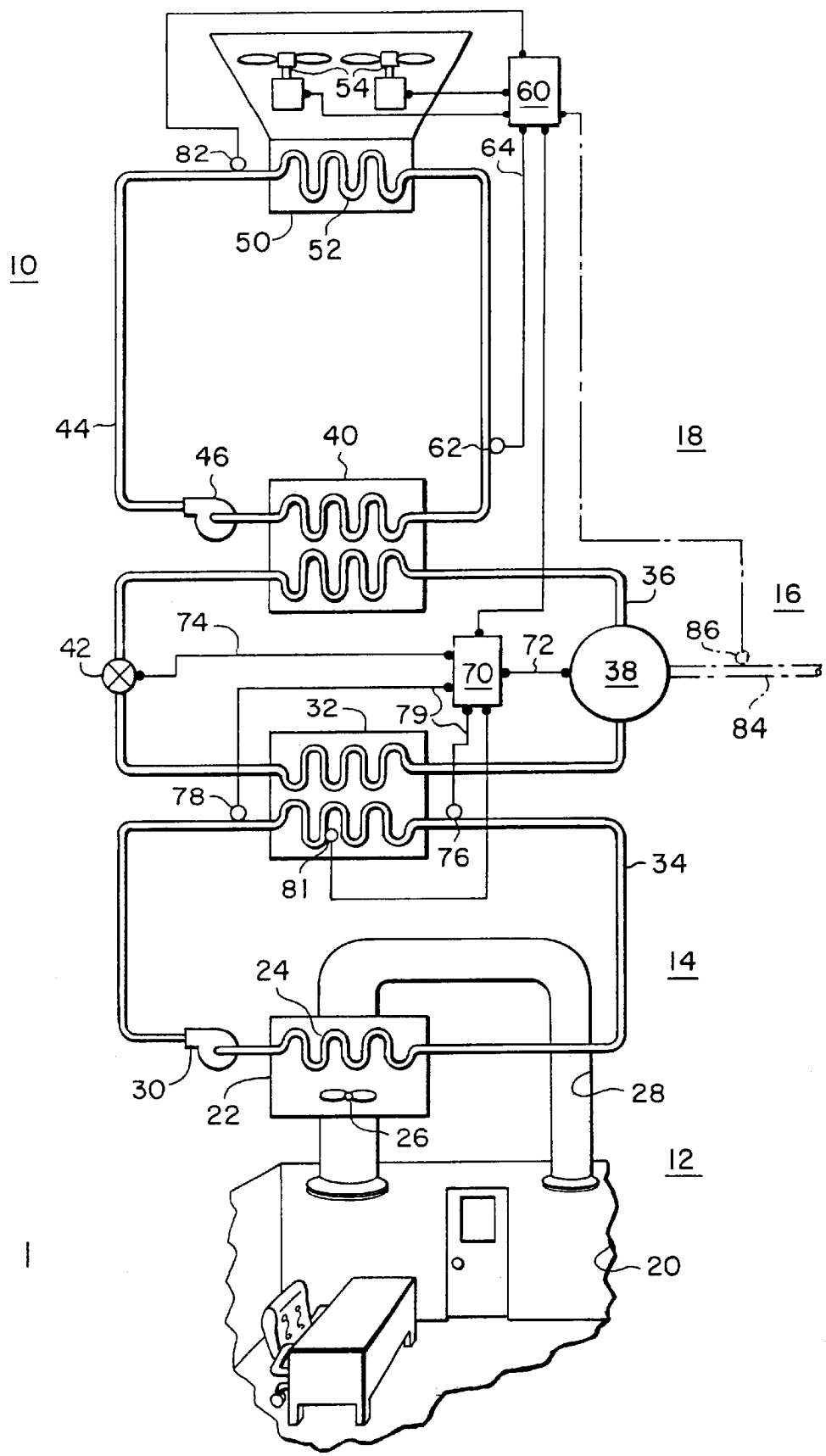
FIG. 1 is a diagram of an air conditioning system including a chiller and a cooling tower in accordance with the present invention.

FIG. 1 shows an air conditioning system 10 which includes an air side loop 12, a first water transport loop 14, a refrigeration loop 16, and a second water transport loop 18. As indicated, the loops 14 and 18 use water as a transport fluid since water is safe, fairly efficient and non-flammable. Other transport fluids are commercially available, and a person of ordinary skill in the art will recognize that the transport fluids need not be the same in each loop 14, 18.

Representative air conditioning systems 10 are sold by The Trane Company. These systems include centrifugal chiller compressor systems and related equipment sold by The Trane Company under the trademark CenTraVac and include Trane Models CVHE, CVHF and CVHG.

Additionally, The Trane Company sells helirotor chiller compressor systems under the trademark Series R including Models RTHA and RTHB. Scroll chiller compressor systems are sold by The Trane Company under the trademark 3D including Model CGWD. A representative chiller system is described in U.S. Pat. No. 5,600,960 to Schwedler et al. which is commonly assigned and hereby incorporated by reference. Representative helirotor systems are described in U.S. Pat. No. 5,347,821 to Oltman et al. and Pat. No. 5,201,648 to Lakowske, both of which are assigned to the assignee of the present invention and incorporated by reference herein. Additionally, chiller systems can use non-mechanical refrigeration compressors such as one or two stage absorption machines to chill the water used by the first water loop 14. Such systems are sold by The Trane Company under the trademarks Thermachill, Horizon, and Cold Generator, or under the Model Numbers ABSC or ABTE. A representative absorption apparatus is described in U.S. Pat. No. 3,710,852 to Porter, this patent being assigned to the assignee of the present invention and incorporated by reference herein. The Trane Company also sells suitable air handlers under the trademarks Climate Changer and Modular Climate Changer. An exemplary air handler is described in U.S. Pat. No. 5,396,782 to Ley et al., this patent being assigned to the assignee of the present invention and incorporated by reference herein.

In the air side loop 12, a load such as a space 20 to be air conditioned is cooled by an air handler 22. The air handler 22 can also be used for heating but is described in terms of a single application, cooling, for ease of explanation. The air handler 22 uses the fluid transported by the first water loop 14 to transfer heat energy from air being circulated from the space 20 by means of a fan 26 and ductwork 28 to a heat exchange coil 24 in the air handler 22.

The transport fluid in the first water loop 14 is circulated by a pump 30 between the air handler 22 and the evaporator 32 of the refrigeration system 16. The pump 30 is capable of varying the flow rate in the loop 14 and is preferably a variable speed pump such as those made by the Buffalo Pump Company, but could alternatively be replaced with a multistage pump. After leaving the pump 30, the evaporator 32 conditions the transport fluid to a predetermined temperature such as 44° F. so that the fluid can be reused and transported by piping 34 to any one of various air handlers 22 (See FIG. 2). The energy extracted from the transport fluid by the evaporator 32 is transported by refrigeration conduit 36 to a compressor 38 which lowers the condensation point of the refrigerant so that the refrigerant can be condensed by a condenser 40 effectively transferring energy to the second water loop 18. A metering device 42 such as an expansion valve or an orifice maintains the pressure differential between the evaporator 32 and the condenser 40.

The heat of condensation in the condenser 40 is transferred to the second water loop 18 where that heat is transported by conduit 44 and a water pump 46 to at least one cooling tower 50. Suitable cooling towers are sold by Marley Cooling Tower Company under the identifiers Series 10, Series and Sigma 160. The cooling tower 50 includes heat exchange surfaces 52 to transfer heat from the second water loop 18 to ambient air, and includes condenser fans 54 which move ambient air over the heat exchange surfaces 52.

A cooling tower controller 60 controls the speed and staging of the cooling tower condenser fans so as to maintain a near optimal cooling tower condenser water temperature as monitored by a sensor 62 and reported to the controller 60 by a connecting line 64. The sensor 62 can be located in the conduit 44 or in a sump or basin of the cooling tower 50.

Similarly, a chiller controller 70 determines whether a chiller is on and controls the chiller operation by a connecting line 72 to the expansion valve 42. A suitable chiller controller is sold by The Trane Company under the trademark UCPII. Other suitable chiller controllers are described in U.S. Pat. No. 5,355,691 to Sullivan et al. and U.S. Pat. No. 5,419,146 to Sibik et al., these patents being assigned to the assignee of the present invention and incorporated by reference herein. Although described herein as a single device, the controller 70 can be implemented as a number of discrete devices, such as microprocessors, working together.

Sensors 76 and 78 are provided to monitor the leaving water temperature and the entering water temperature of the evaporator 32 respectively. Electrical lines 79 are provided to connect those sensors 76 and 78 to the controller 70. The difference (Delta T) between the leaving water temperature as measured by the sensor 76 and the entering water temperature as measured by the sensor 78 provides a measure of the actual load on any given chiller, particularly when the flow rate in the first water loop, as measured by a sensor 81 measuring the pressure drop across the evaporator, is also known. Thus actual load is a function of Delta T ($\Delta T$) and the flow rate.

Figure 2:
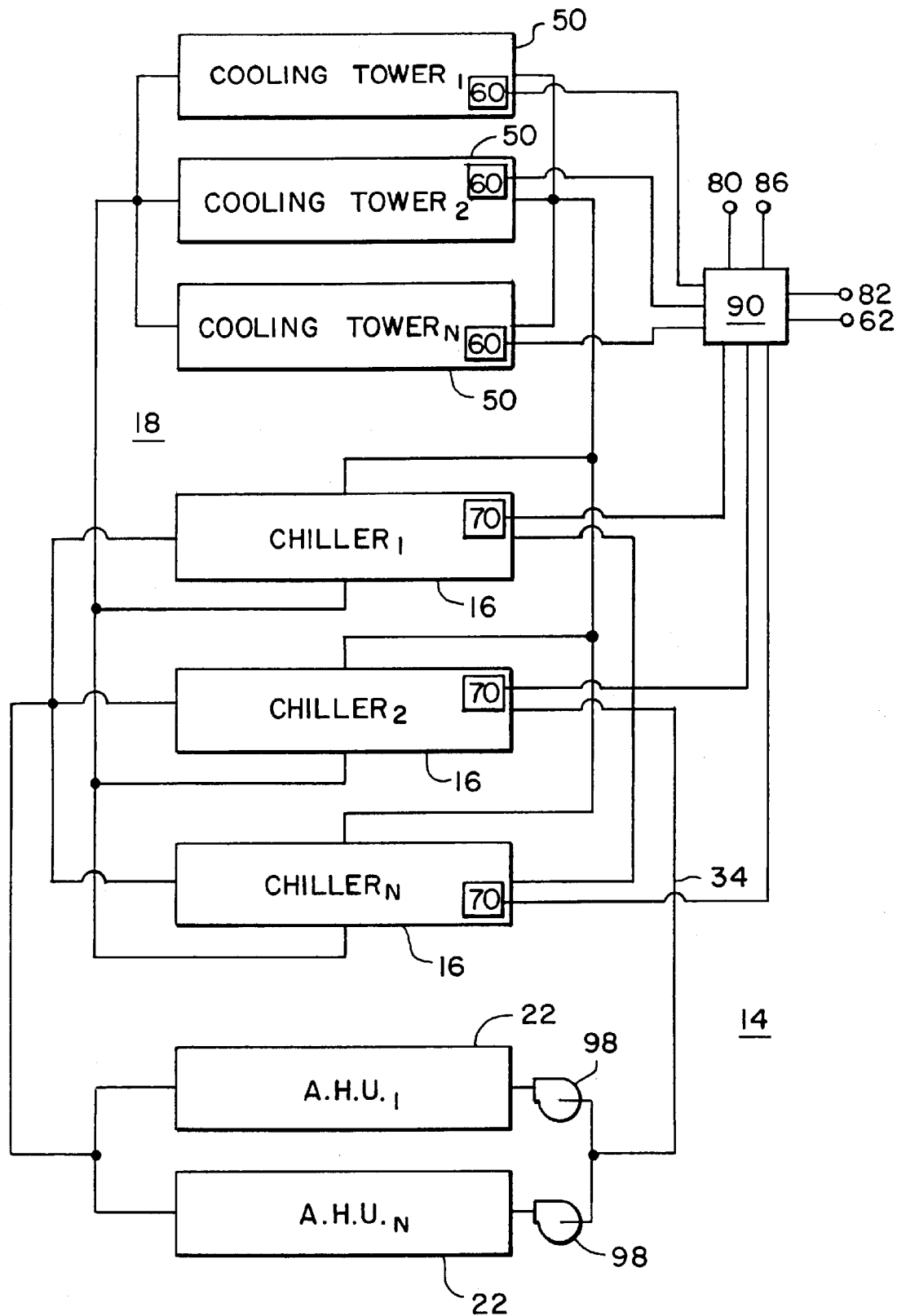
FIG. 2 is a diagram of an air conditioning system showing the parallel piping arrangements for multiple cooling towers and multiple chillers in accordance with FIG. 1.

Although there are a number of ways to accomplish the controls, applicant prefers the use of a system controller 90 overseeing and managing the individual controllers 60, 70 of each equipment group 50, 16. Such a controller 90 is sold by The Trane Company under the trademark Tracer. As shown in FIG. 2, each cooling tower 50 has an individual controller 60, and each chiller 16 has an individual controller 70. The system controller 90 is operably connected to each cooling tower controller 60 and to each chiller controller 70 so as to integrate their operation. The system controller 90 is also operably connected to the pump(s) 46 and controls the variable flow rate of the pump(s) 46. Additionally, the system controller 90 can be arranged to receive the input signals from the condenser water temperature sensor 62, the wet bulb temperature sensor 80, the flow rate sensor 82 and the steam rate sensor 86 and process and forward the input signals to the controllers 60,70. For this reason, the system controller 90 includes a conventional microprocessor for undertaking the calculations described with respect to FIG. 4 and for forwarding the cooling tower setpoint to the cooling tower controllers 60 and for forwarding other information to the controller 60, 70 such as the inputs from the sensors.

With reference to FIG. 2, the terms chiller, cooling tower and air handler are used both in the singular and plural sense throughout this document. For example, FIG. 2 shows a plurality of chillers 16 piped in parallel (shown) or in series (not shown) to provide the cooling water to the first water loop 14 by means of its conduit 34. The water is provided to a plurality of air handlers 22 also piped in parallel. Similarly, the cooling towers 50 are piped in parallel in the second water loop 18 and connected in parallel with the condensers 40 of the various chillers. Thus the chiller controllers 70 and the cooling water tower controllers 50 can turn on chillers 16 as needed to meet the air handler load by maintaining a particular temperature in the first water loop 14. Similarly, the cooling tower controllers 60 can turn on cooling towers 50, stage fans 54, or vary the fan speed of the fans 54 in those cooling towers 50 to maintain a particular water temperature in the second water loop 18.

Figure 3:
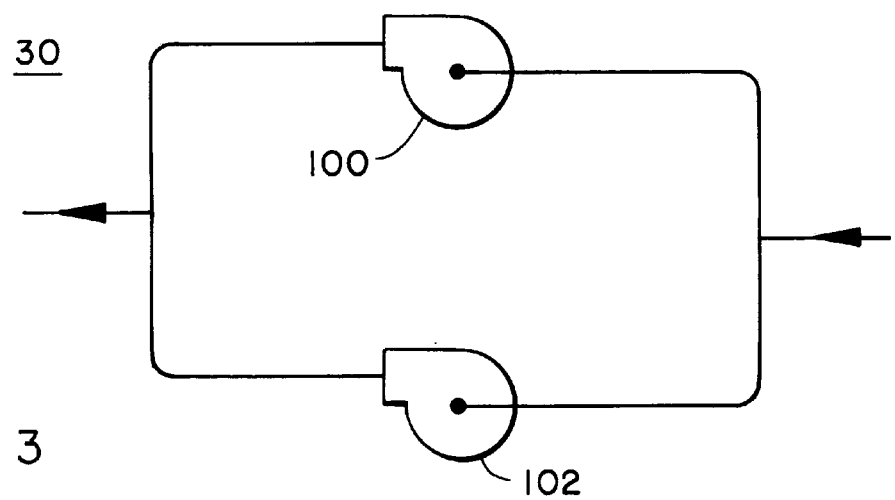
FIG. 3 is a diagram of an alternative pump arrangement to the arrangements of FIGS. 1 and 2.

In FIG. 2, a separate variable speed water pump 98 for each air handler 22 replaces the single variable speed water pump 30 of FIG. 1. Referencing FIG. 3, the pump 30 is represented by several pumps 100, 102 in parallel circuited arrangement. This allows more discrete control by having several pumps with narrower operating ranges as opposed to the single larger pump shown in FIG. 1.

Figure 4:
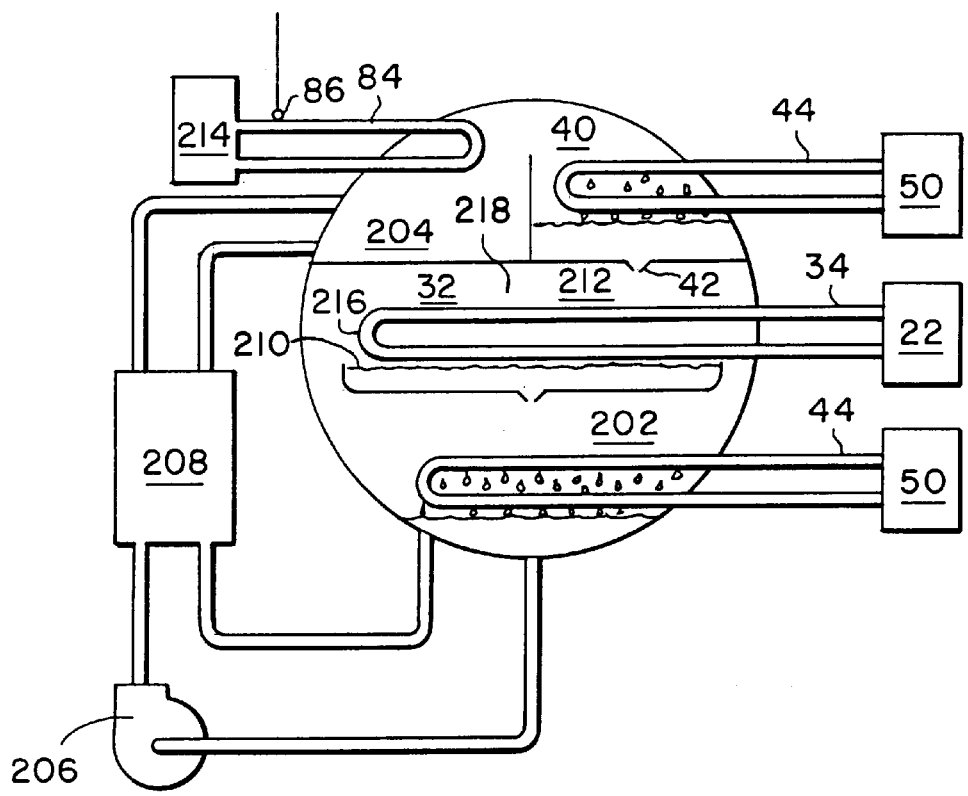
FIG. 4 is a diagram of an absorption refrigeration system suitable for use with the present invention.

FIG. 1 is shown as a mechanical refrigeration system. As shown in FIG. 4, an absorber 202, generator 204, pump 206 and recuperative heat exchanger 208 replace the compressor 38 in an absorption refrigeration system. Like mechanical refrigeration, the cycle "begins" when high-pressure liquid refrigerant from the condenser 40 passes through a metering device 42 into the lower-pressure evaporator 32, and collects in the evaporator pan or sump 210. The "flashing" that occurs at the entrance 212 to the evaporator cools the remaining liquid refrigerant which is then sprayed over a coil 216 using a spray tree 218. Similarly, the transfer of heat from the comparatively warm system water 34 to the now-cool refrigerant causes the refrigerant to evaporate, and the resulting refrigerant vapor migrates to a lower-pressure absorber 202. There, the refrigerant is "soaked up" by an absorbent lithium-bromide solution. This process not only creates a low-pressure area that draws a continuous flow of refrigerant vapor from the evaporator 32 to the absorber 202, but also causes the vapor to condense as the vapor releases the heat of vaporization picked up in the evaporator 32 to cooling water in the conduit 44. This heat—along with the heat of dilution produced as the refrigerant condensate mixes with the absorbent—is transferred to the cooling water in the conduit 44 and released in the cooling tower 50.

Assimilating refrigerant dilutes the lithium-bromide solution and reduces its affinity for refrigerant vapor. To sustain the refrigeration cycle, the solution must be reconcentrated. This is accomplished by constantly pumping dilute solution from the absorber 202 through the pump 206 to the generator 204, where the addition of heat from a heat source 214 such as steam boils the refrigerant from the absorbent. Once the refrigerant is removed, the reconcentrated lithium-bromide solution returns to the absorber, ready to resume the absorption process. The refrigerant vapor "liberated" in the generator 204 migrates to the condenser 40. In the condenser 40, the refrigerant returns to its liquid state as the cooling water in the conduit 44 picks up the heat of vaporization carried by the vapor and transfers it to the cooling tower 50. The liquid refrigerant's return to the metering device 42 marks the cycle's completion. Further details of absorption systems can be derived from the previously referenced U.S. Pat. No. 3,710,852 to Porter.

Figure 5:
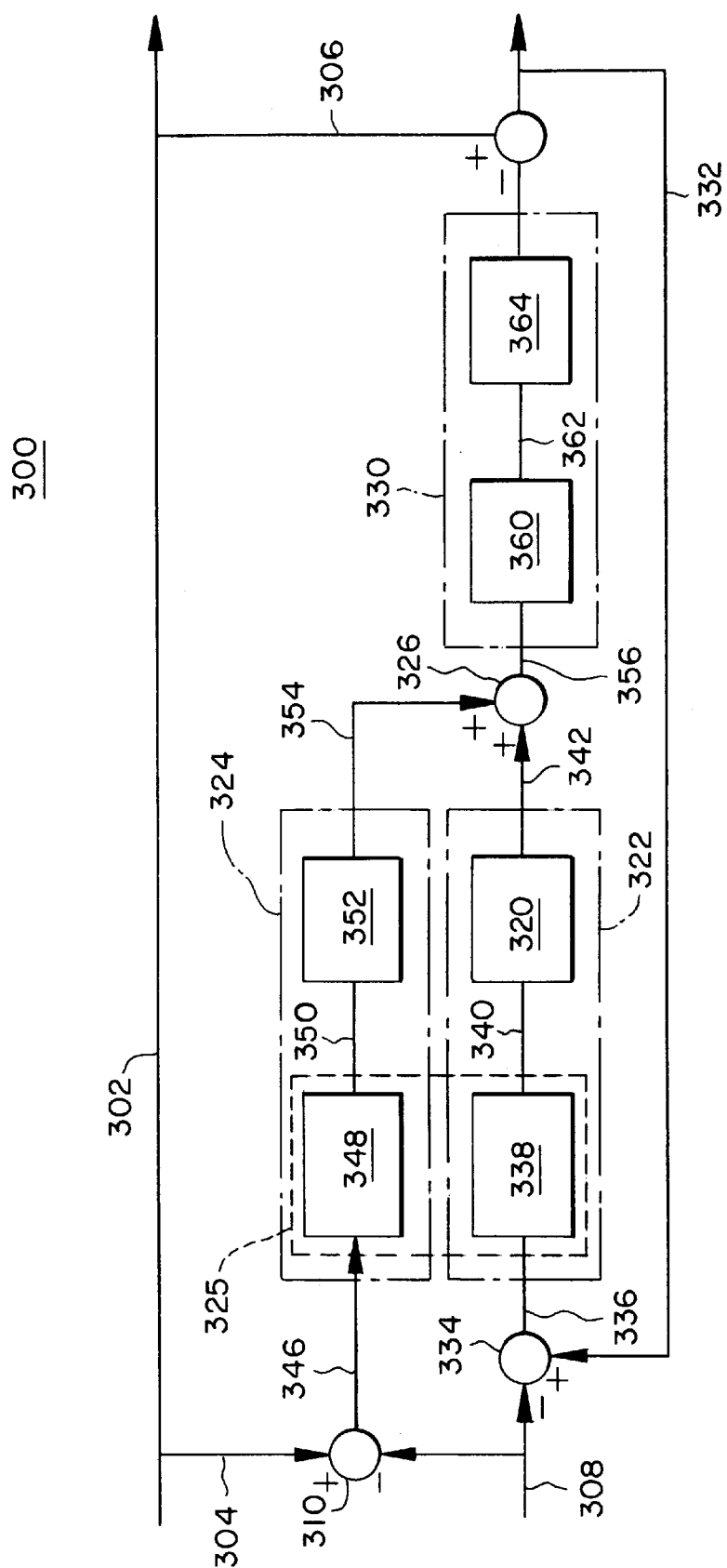
FIG. 5 is a control diagram showing the present invention.

The operation of the present invention is discussed with regard to FIG. 5. FIG. 5 is a control diagram 300 of the present invention. A person of ordinary skill in the art will recognize that the control diagram can be implemented in hardware, software, or firmware, and is preferably implemented within the controller 70.

The controller 70 uses a combination of feed forward and feedback control to control chiller capacity. The controller 70 includes a conventional PID controller 320 which is part of a feedback control system 322. The controller 70 also includes a feed forward control system 324 which operates in parallel with the feedback control system 322. A variable flow section 325 is common both to the feedback control system 322 and to the feed forward control system 324. The controller 70 varies the chiller cooling capacity in response to the system error. Preferably, the chiller cooling capacity is controlled as a function of the leaving water temperature, but the chiller cooling capacity may also be controlled as a function of the entering water temperature or as a function of the difference between the entering water temperature and the desired leaving water temperature ($\Delta T$). The preferable control mechanism is to compare the leaving water temperature with a desired temperature conventionally entered by a user in the form of a setpoint, and to control the chiller capacity to minimize that error.

The feedback control system 322 and the feed forward control system 324 each make independent control determinations. The control determinations of the feedback control system 322 and the feed forward control system 324 are then combined in a comparitor 326 and used in a chiller capacity control portion 330 of the controller 70 to determine chiller capacity.

In the control diagram 300, a line 302 represents the evaporator water temperature including the entering water temperature at 304 as measured by the sensor 78 and the leaving water temperature at 306 as measured by the sensor 76. A leaving water temperature setpoint is entered by a line 308. At step 310, the evaporator entering water temperature from line 304 is compared to the leaving water temperature setpoint from line 308 to determine a desired $\Delta T$.

In the feedback control system 322, the evaporator leaving water temperature is returned on line 332 and compared by a comparitor 334 with the leaving water temperature setpoint from line 308 to determine an error. The resultant error is forwarded on line 336 to the feedback controller 322. At a feedback gain adjuster 338, the variable flow control section 325 is used to improve the feedback control 322. Since a large reduction in chilled water flow can cause control instabilities in the feedback loop, the gain must be adjusted to compensate.

For example, typical chilled water flow is 2.4 gallons per minute for every ton of designed chiller capacity. This corresponds to a temperature difference in chilled water entering and leaving water temperatures of 10F. At nominal water flow rates, a 1° error in leaving water temperature is 10% of chiller capacity. If flow is reduced to 1.2 gallons per minute per ton, or in half, then a 1° error in leaving water temperature should only be 5% of chiller capacity. If the feedback gains are not adjusted, the effective gains can be doubled and, as flow is further decreased, the effective gain will continue to increase and can cause instability in the feedback controller.

For further example, using data obtained in the test of a 500 ton chiller tuned to operate at a nominal water flow rate of 2.4 gallons per minute per ton, the flow is reduced to 0.6 gallons per minute per ton. The feedback gain essentially increased by a factor of 4 times nominal. In the feedback gain adjuster 338, a feedback correction in chiller capacity $Q_e$ is calculated. $Q_e$ is determined by the following formula.

$$Q_e = \frac{dV}{24} \cdot e \cdot 100\%$$

where $Q_e$ equals the feedback correction in chiller capacity in percent;

e equals the error in chiller capacity as determined by the chilled water supply temperature minus the chilled water setpoint; and dV equals the chilled water flow in gallons per minute per ton.

The feedback correction $Q_e$ is then forwarded by line 340 to the PID controller 320, recognizing that any single input, single output controller or equivalent could be used in place of the PID controller. The PID controller 320 calculates a desired chiller capacity and forwards it by line 342 as an output.

At the same time this is going on, the feed forward controller 324 is making major changes in chiller capacity to cancel out measured load disturbances. The feed forward control 324 changes chiller capacity to match measured changes in the load applied to the chilled water loop 14. The feed forward controller 324 calculates a desired chiller capacity $Q_c$ using the following formula.

$$Q_c = \frac{dV}{24} \cdot \text{Desired } \Delta T \cdot 100\%$$

where $Q_c$ equals the desired chiller capacity in percent;

desired $\Delta T$ equals the chilled water return temperature minus the chilled water setpoint in degrees Fahrenheit; and dV equals the chilled water flow in gallons per minute per ton.

In the formulas for calculating $Q_e$ and $Q_c$, measured flow is divided by the chiller's design capacity to obtain dV in gallons per minute per ton to make the application of the comparable flow easier. This makes the application of the variable flow calculation identical for every chiller size. In a variable flow chilled water system, dV is not constant. The feed forward control cancels out both load disturbances and flow rate disturbances.

In FIG. 5, the desired $\Delta T$ is calculated at 310 by a comparison of the entering water temperature provided by the line 304 with the leaving water temperature setpoint provided by line 308. This desired $\Delta T$ is forwarded on a line 346 to the feed forward controller 324. The variable flow calculation of $Q_c$ is made in a block 348 and $Q_c$ is forwarded by a line 350 to a block 352 for a calculation of the concentrated chiller capacity. This is output on a line 354 and combined with the desired chiller capacity determined by the feedback controller 320 at comparitor 326. The accumulated desired capacity is forwarded on a line 356 to the chiller capacity control 330 which is generally conventional in nature. In the capacity control 330, gain is compensated at step 360 and the compensated signal is forwarded by line 362 for a determination of chiller capacity at step 364 and the chillers are controlled.

What has been described is an improvement in chiller capacity control. Specifically, the present invention describes a control method that, given a measurement of chilled water flow, will automatically adjust capacity control to reject disturbances caused by variable flow chilled water and to maintain control stability at low water flow rates. The variable flow control is an adjustment of the feedback control loop and a feed forward control loop. For capacity control, the feedback loop is required to achieve zero steady state error while the feed forward loop allows the control to reject the disturbance caused by the variable flow chilled water. A person of ordinary skill in the art will recognize that the present invention is applicable to any chiller of fluids particularly including water but also applicable to all other fluids used for air conditioning.

What is desired to be secured for Letters Patent of the United States is set forth in the following claims:

1. A chiller system including a chilled fluid loop where the temperature of the fluid is controlled by varying the capacity of a chiller comprising:

a variable capacity chiller including an evaporator;

a chilled fluid loop in heat transfer relation with the evaporator;

a sensor measuring the leaving fluid temperature of the evaporator;

a sensor measuring the entering fluid temperature of the evaporator;

a mechanism for providing a desired leaving fluid temperature;

a pump controlling the rate of fluid flow in the fluid loop; and a controller operably controlling the chiller capacity and the variable flow rate of the pump, the controller being connected to the setpoint mechanism and the entering and leaving fluid temperature sensors;

wherein the controller includes a feedback loop controlling chiller capacity in response to leaving fluid temperature and wherein the controller includes a feed forward loop controlling chiller capacity in response to entering fluid temperature.

2. The system of claim 1 wherein the pump is controlled as a function of the entering fluid temperature.

3. The system of claim 1 wherein the pump is controlled as a function of the leaving fluid temperature.

4. The system of claim 3 wherein the pump comprises several pumps in parallel circuiting arrangement.

5. The system of claim 1 wherein the feedforward loop includes a comparison of entering fluid temperature and desired leaving fluid temperature.

6. The system of claim 5 wherein the fluid is water.

7. The system of claim 1 wherein the feedback loop adjusts chiller capacity as a function of the variable flow rate.

8. A chiller system comprising:

an evaporator having a fluid flow therethrough;

a chilled fluid loop in heat transfer relation with the evaporator;

a first sensor positioned to measure a first temperature of fluid leaving the evaporator;

a second sensor positioned to measure a second temperature of fluid entering the evaporator;

a mechanism establishing a desired leaving fluid temperature; and a controller operably connected to the setpoint mechanism and the first and second sensors wherein the controller includes a feedback loop operating in response to the first sensor and wherein the controller includes a feedforward loop operating in response to the second sensor.

9. The system of claim 8 further including a pump in the chilled fluid loop operable to control the rate of fluid flow in the fluid loop.

10. The system of claim 9 wherein the controller is operably connected to the pump to control the flow rate therethrough.

11. The system of claim 10 wherein the pump is controlled as a function of the temperature measured by the second sensor.

12. The system of claim 10 wherein the pump is controlled as a function of the temperature measured by the first sensor.

13. The system of claim 10 further including a chiller having a variable capacity, the chiller including the evaporator, and the controller being operably linked to the chiller to control the variable capacity by means of the feedback loop and the feedforward loop.

14. The system of claim 13 wherein the variable capacity chiller is a mechanical refrigeration system including a compressor.

15. The system of claim 13 wherein the variable capacity chiller is an absorption refrigeration system including an absorber and a generator.

16. A controller for a variable capacity chiller including an evaporator, a chilled fluid loop in heat transfer relationship with the evaporator, a pump controlling the rate of fluid flow in the fluid loop, a first sensor measuring a condition of the fluid in the loop, and a second sensor measuring a second condition in the fluid loop, the controller comprising:

a controller operably coupled to and controlling the chiller capacity, the controller being operably coupled to and controlling the variable flow rate of a pump and the controller being operably connected to and receiving a first condition measurement from the first sensor and a second condition measurement from the second sensor;

the controller including a feedback loop controlling the chiller's capacity in response to the first measured condition and the controller further including a feed-forward loop controlling the chiller capacity in response to the second measured condition.

17. The controller of claim 16 wherein the first measured condition is the temperature of fluid leaving the evaporator and wherein the second measured condition is the temperature of fluid entering the evaporator.

18. The controller of claim 16, wherein the first measured temperature is compared with a desired temperature and the feedback loop is operated to minimize the difference between the measured and desired temperatures.

19. A controller for a variable capacity chiller including an evaporator, a chilled fluid loop in heat transfer relationship with the evaporator, a pump controlling the rate of fluid flow in the fluid loop, a first sensor measuring a condition of the fluid in the loop, a second sensor measuring a second condition in the fluid loop, the controller comprising:

a controller operably coupled to and controlling the chiller capacity, the controller being operably coupled to and controlling the variable flow rate of a pump and the controller being operably connected to and receiving a first condition measurement from the first sensor and a second condition measurement from the second sensor;

the controller including a feedback loop controlling the chiller's capacity in response to the first measured condition and the controller further including a feed-forward loop controlling the chiller capacity in response to the second measured condition; and wherein the feedback and the feed forward loops each make independent control determinations and the independent control determinations are then combined in a comparitor and used to determine chiller capacity.

* * * * *